Patented Feb. 20, 1951

2,542,401

UNITED STATES PATENT OFFICE 2,542,401

CYANINE DYESTUFFS

Frank Peter Doyle and John David Kendall, Ilford, England, assignors to Ilford Limited, Ilford, England, a British company No Drawing. Application January 21, 1948, Serial No. 3,562. In Great Britain January 24, 1947

2 Claims. (Cl. 260—240.6)

This invention relates to the production of symmetrical and unsymmetrical dye salts and bases.

According to the present invention cyanine dyestuffs are obtained by condensing together, as first reactant, an intermediate of the general Formula I:

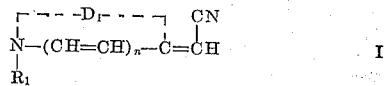

where $R_1$ is an alkyl or aralkyl group, $D_1$ is the residue of a heterocyclic 5-membered or 6-membered nucleus and $n$ is nought or one and, as second reactant, an alkyl or aralkyl quaternary salt of a five-membered or six-membered heterocyclic nitrogen compound having in $\alpha$ or $\gamma$ position to the quaternary nitrogen atom a thioether or selenoether group (including an aryl, alkyl or aralkyl thioether or selenoether group) separated from the heterocyclic nucleus by a vinyl or butadienyl group, or a $-(CH=CH)_mNH_2$ group where $m$ is 1, 2 or 3 (including N-acyl, N-aryl and N-acylaryl substituted groups of this type).

For the sake of convenience the expression "thioethervinyl and selenoether-vinyl types of group" will be understood to mean the various classes of such groups referred to above, and the expression "amino vinyl type of group" will be understood to mean the various groups of the formula $-(CH=CH)_mNH_2$ and substitution derivatives referred to above.

The foregoing condensation is preferably effected in the presence of a condensing agent, e. g. acetic anhydride, or a basic condensing agent, e. g. pyridine, triethylamine or sodium acetate in ethyl alcohol, and the product obtained is a cyanine dye containing a CN substituent in the chain linking the two heterocyclic nuclei. The products are alkyl or aralkyl quaternary salts.

If the heterocyclic nuclei in the two reactants are of the same character, a symmetrical cyanine dye with respect to the heterocyclic nuclei is obtained; if they are different the product is unsymmetrical.

In a modification of the foregoing process the intermediate of Formula I may be converted to an alkyl or aralkyl salt by reaction with an acid HX (X representing an acid radicle) giving the intermediate of general Formula II:

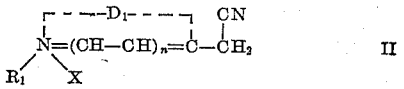

and this may be reacted with a quaternary salt of a heterocyclic nitrogen compound as before to yield the same products, the elements HX being removed during the reaction.

Intermediates of general Formula II are in some cases more reactive than those of general Formula I, and the use of the former in some cases presents an advantage. Where an intermediate of general Formula II is employed it is desirable to effect the reaction in the presence of a basic condensing agent in order to facilitate the removal of the elements HX.

The products obtained according to the present invention conform to the general formula:

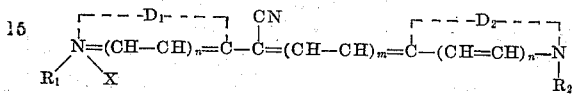

where $R_1$ and $R_2$ are alkyl or aralkyl groups, $D_1$ and $D_2$ are residues of five-membered or six-membered heterocyclic nitrogen nuclei, $n$ is nought or one and $m$ is 1, 2 or 3. The products are valuable sensitizers for silver halide photographic emulsions.

The ring system $D_1$ of the intermediate of Formula I or II and the ring system $D_2$ of the heterocyclic compound reacted therewith may, as stated above, be he same or different. Each may be, for example, selected from thiazoles, oxazoles, selenazoles and their polycyclic homologues such as those of the benzene, naphthalene, acenaphthene and anthracene series, pyridine and its polycyclic homologues such as quinoline and $\alpha$- and $\beta$-naphthoquinolines, lepidines, indolenines, diazines (e. g. thio $\beta\beta'$-diazole), oxazolines, thiazolines and selenazolines. The polycyclic compounds of these series may also be substituted in the carbocyclic rings with one or more groups such as alkyl, aryl, amino, hydroxy, alkoxy methylene-dioxy groups, or by halogen atoms.

The acid radicle X in general Formula II and the acid radicle of the quaternary salt of the heterocyclic compound may be, for example, halide, sulphate, or p-toluene sulphonate.

Where alkyl groups are referred to they may be lower alkyl, e. g. methyl, ethyl or propyl, which is generally preferable, or they may be higher alkyl groups. Aralkyl groups may be benzyl or naphthylmethyl groups.

Some intermediates of general Formula I are known compounds; all of them may be made by reacting an alkyl or aralkyl quaternary salt of a heterocyclic nitrogen compound having in the $\alpha$ or $\gamma$ positions to the quaternary nitrogen atom a reactive halogen atom or thioether or selenoether grouping directly attached to the heterocyclic nucleus and cyanoacetic acid; the reaction preferably being effected using equimolecular proportions of the reactants and in the presence of a basic condensing agent such as pyridine.

The following are examples, in which the parts are by weight, of the preparation of suitable intermediates.

PREPARATION OF 2 - CYANO-METHYLENE-3-METHYLDIHYDROBENZTHIAZOLE 9.0 parts of 2-methyl thio benzthiazole and 9.3 parts of methyl-p-toluene sulphonate were fused at 100° C. for 2 hours and then 4.3 parts of cyanacetic acid and 40 parts of pyridine were added and the mixture boiled for 30 minutes. The solution on cooling and diluting with water deposited the desired material which was separated by filtration and crystallised from benzene as small white plates, m. pt. 103° C. (to a clear liquid).

PREPARATION OF 2-CYANO-METHYLENE-3-ETHYLDIHYDROBENZTHIAZOLE 3.0 parts of 2-ethyl thio benzthiazole and 4.0 parts of ethyl-p-toluene sulphonate were fused at 140–150° for 4 hours and the cooled melt washed three times with benzene to remove any unchanged intermediates or thione formed. 1.7 parts of cyanacetic acid and 15 parts of pyridine were added and the mixture boiled for 30 minutes, then cooled and diluted with water to precipitate an oil which slowly crystallised. The crystals were separated by filtration, washed and crystallised from a small quantity of benzene as small white plates, m. pt. 109° C. (to a clear liquid).

PREPARATION OF 6-NITRO-2-CYANO-METHYLENE - 3-METHYLDIHYDROBENZ-THIAZOLE 4.5 parts of 6-nitro-2-methylthio-benzthiazole and 3.7 parts of methyl-p-toluene sulphonate were fused at 140° C. for 3 hours. 1.7 parts of cyanacetic acid and 15 parts of pyridine were added and the mixture boiled for 30 minutes, the resulting yellow solution being diluted with water to precipitate the product, which was separated by filtration, washed and crystallised from benzene. The yellow crystalline product melted at 185° C.

PREPARATION OF 2-CYANOMETHYLENE-1-ETHYL-DIHYDROQUINOLINE 9.5 parts of 2-ethylthioquinoline and 10 parts of ethyl-p-toluene sulphonate were fused for 4 hours at 140–150° C. and the cool melt washed three times with benzene. 4.3 parts of cyanacetic acid and 40 parts of pyridine were added and the mixture boiled for 30 minutes, then cooled and diluted to precipitate an oil which slowly crystallised, which then was separated by filtration and crystallised from a small quantity of benzene to give yellow crystals, m. pt. 149° C.

PREPARATION OF 2 - ($\varpi$ - CYANOMETHYLENEVINYL) -3-METHYL - DIHYDROBENZ-THIAZOLE 2.0 parts of 2-($\varpi$-ethylthiovinyl) benzthiazole metho-p-toluene sulphonate, 0.84 part of cyanacetic acid and 20 parts of pyridine were refluxed for ¾ hour and the resultant orange solution cooled and diluted with water. The precipitated solid was separated by filtration, washed with ethyl alcohol and soxhletted with dry ether from which the desired product was obtained by evaporation. A final crystallisation from methyl alcohol gave a red-brown powder, m. pt. 165° C.

The following examples will serve to illustrate the invention:

EXAMPLE 1

2[3-methyl benzthiazole]-2'[3-methyl-5-chlorobenzthiazole]α-cyano trimethine cyanine iodide 8.5 parts of 2($\varpi$-ethylthio vinyl)-5-chlor-benzthiazole-metho-p-toluene sulphonate, 3.8 parts of 2-cyanmethylene - 3 - methyl-dihydrobenzthiazole and 150 parts of pyridine were refluxed for 30 minutes and poured into aqueous potassium iodide solution. Dilution effected precipitation of the dyestuff which was filtered, washed and crystallised from methyl alcohol to give mauve-red crystals, m. pt. 214° C. (with decomposition).

EXAMPLE 2

Bis - 2[3-ethyl - benzthiazole]α-cyano trimethine cyanine iodide 21 parts of 2-($\varpi$-ethylthio-vinyl)-benzthiazole etho-p-toluene sulphonate and 10 parts of 2-cyano-methylene - 3-ethyl - dihydrobenzthiazole were boiled in 200 parts of acetic anhydride for one hour and the orange-red solution poured into hot aqueous potassium iodide solution to decompose the acetic anhydride and to precipitate the dyestuff as the iodide. This was filtered, washed and crystallised from methyl alcohol to give glittering crystals, m. pt. 254° C. (decomp.).

EXAMPLE 3

2[1 - methyl - quinoline]2'[133 - trimethyl - indolenine]α-cyano trimethine cyanine iodide 42 parts of 2($\varpi$-ethylthio-vinyl)-3,3-dimethyl indolenine metho-p-toluene sulphonate and 18 parts of 2-cyano-methylene-1-methyl-dihydroquinoline were boiled in 300 parts of acetic anhydride for one hour and the deep red solution poured into aqueous potassium iodide solution to decompose the solvent and precipitate the dyestuff as the iodide. This was filtered, washed and recrystallised from methyl alcohol to give glittering green needles, m. pt. 222° C. (decomp.).

EXAMPLE 4

2[1-methyl-quinoline]-2'[3-methyl benzoxazole] α-cyano trimethine cyanine iodide 39 parts of 2($\varpi$-ethylthio-vinyl)-benzoxazole metho-p-toluene sulphonate and 18 parts of 2-cyanomethylene-1-methyl-dihydroquinoline were boiled in 300 parts of acetic anhydride, the dyestuff formed being isolated and crystallised as in Example 3. It was obtained as brown-red crystals, m. pt. 230° C. (decomp.).

The dyes obtained are valuable sensitisers for silver halide photographic emulsions. For example, the product of Example 1, incorporated in a gelatino silver iodobromide emulsion, imparts a band of sensitivity with a maximum at about 5650 Å.

What we claim is:

1. A process for the production of cyanine dyes which comprises condensing together 2-cyanmethylene - 3 - methyl - dihydrobenzthiazole and 2($\varpi$-ethylthio-vinyl)-5-chlorbenzthiazole-metho-p-toluene sulphonate in the presence of pyridine.

2. A process which comprises condensing together 2 - cyanomethylene-3-ethyl-dihydrobenzthiazole and 2-(omega-ethylthio-vinyl) - benzthiazole ethyl-p-toluene sulphonate in the presence of acetic anhydride.

FRANK PETER DOYLE.
JOHN DAVID KENDALL.

REFERENCES CITED

The following references are of record in the file of this patent:

UNITED STATES PATENTS

| Number | Name | Date |
|---|---|---|
| 2,107,379 | Koslowsky | Feb. 8, 1938 |
| 2,345,094 | Brooker | Mar. 28, 1944 |
| 2,349,179 | Kumetat | May 16, 1944 |
| 2,354,524 | Kumetat | July 25, 1944 |
| 2,393,743 | Brooker | Jan. 29, 1946 |

OTHER REFERENCES

Mills: J. Chem. Soc. (London), vol. 127 (1925), pp. 2466–2474.